Z. RODAKOWSKI.
CONVEYING APPARATUS.
APPLICATION FILED JULY 28, 1913.
1,077,162.
Patented Oct. 28, 1913.
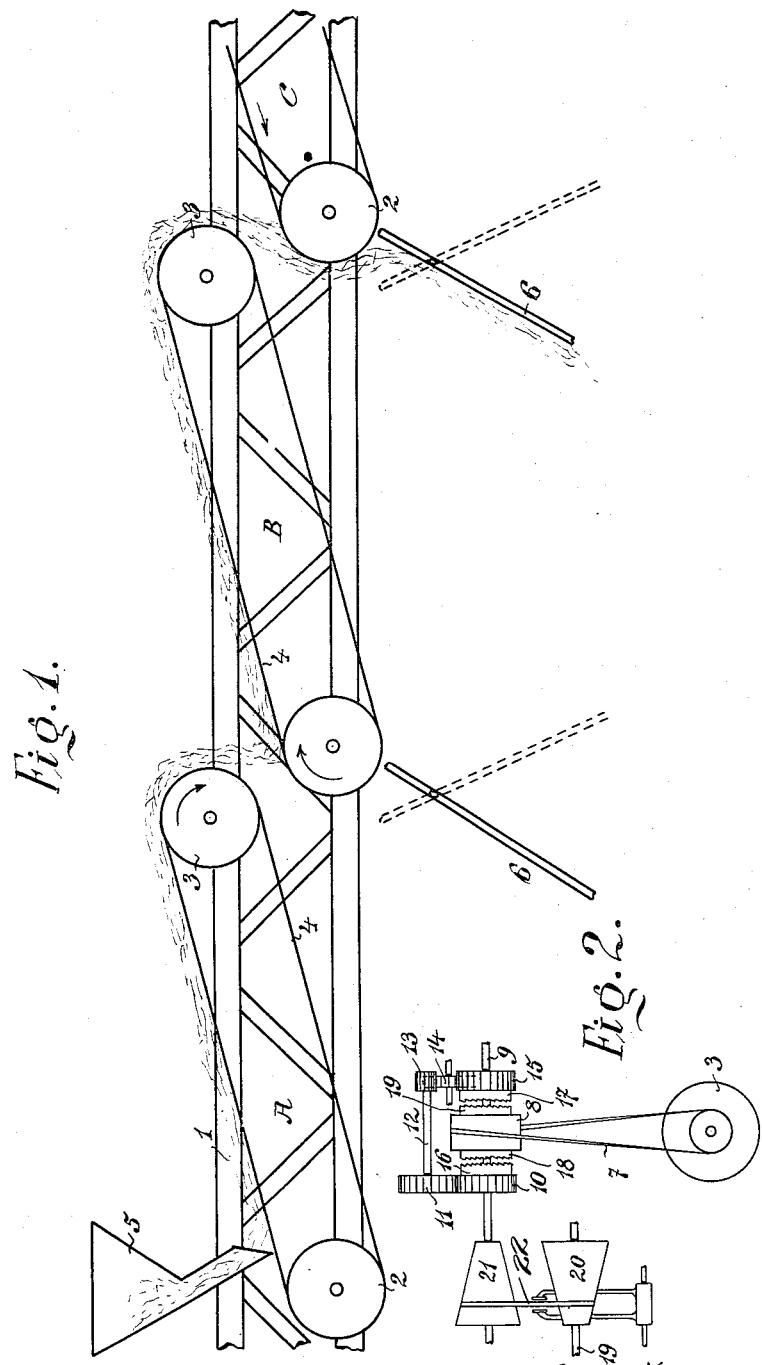

UNITED STATES PATENT OFFICE.

ZYGMUNT RODAKOWSKI, OF LEMBERG, AUSTRIA-HUNGARY.

CONVEYING APPARATUS.

1,077,162.  Specification of Letters Patent.  Patented Oct. 28, 1913.

Application filed July 28, 1913. Serial No. 781,615.

*To all whom it may concern:*

Be it known that I, ZYGMUNT RODAKOWSKI, a subject of the Emperor of Austria-Hungary, residing at Lemberg, Empire of Austria-Hungary, have invented certain new and useful Improvements in Conveying Apparatus; and I do hereby declare the following to be a full, clear, and exact description of the invention, such as will enable others skilled in the art to which it appertains to make and use the same.

My invention relates to conveying apparatus in which a series of endless belts supported by pulleys journaled in a suitable frame work, is so arranged that the material delivered to one of the endless belts near one of the end pulleys supporting the same is carried by this belt to its other end pulley and thence delivered to the next endless belt of the series, or allowed to fall on the ground or in to a receptacle.

Heretofore in conveying apparatus of this class between the delivering end of one belt and the receiving end of the next following belt swinging gates have been provided, which in one position guide the material conveyed from the delivering end of one belt to the receiving end of the other, while in another position they cause the material conveyed to be thrown off without reaching the next conveying belt.

The object of my invention is to so construct and arrange a conveying apparatus of this class that it is suitable for sticky material such as moist loam and permits the material conveyed to be thrown off at a plurality of points simultaneously. I attain this result by driving the various endless belts independently the one of the other so that the speed of each of the various conveying belts of the apparatus may be selected at will and by reducing the speed of one conveying belt relatively to that of the preceding one or by entirely stopping the former, or reversing its direction of movement part or all of the material conveyed by the preceding conveying belt is thrown off between the two belts, and only that part of the material which is not so thrown off is received and conveyed away by the next following conveying belt. In this way the material supplied to the conveying apparatus at one of its ends may be thrown off at different points along the entire plant simultaneously and the proportions of the quantities of material thus thrown off at different points may be governed at will by properly adjusting the speed of each of the conveying belts relatively to that of the preceding one.

In the accompanying drawings forming a part of this application, and in which similar reference symbols indicate corresponding parts in the several views: Figure 1 is a side elevation of my invention illustrating two complete conveyer sections and a fragmentary section; and Fig. 2 is a detail of a speed changing and reversing mechanism.

Each of the conveyer sections consists of two diagonally disposed pulleys 2, 3, journaled in a suitable frame 1 and an endless belt 4 running over the said pulleys 2, 3. The material is supplied to the first section A in any suitable manner, say by a hopper 5. Below the delivery end of one section and the receiving end of the next following section I provide pivoted distributing gates 6 which act to distribute the material thrown off at this point over a large area by simply varying the position of these gates from time to time.

One or both pulleys of each section are driven independently of that or those of the other sections by some suitable change speed gearing, which may be constructed in any suitable or preferred manner. As shown by way of example in Fig. 2 the pulley 3 of each section is driven by a belt or rope 7 from a pulley 8 loose on a shaft 9. Fast on this shaft is a pinion 10, which engages with a pinion 11 on a shaft 12 carrying another pinion 13 meshing with an intermediate pinion 14 engaging with a pinion 15 loose on the shaft 9 so that the pinions 15 and 10 revolve in opposite directions. The pinions 11 and 15 carry clutch portions 16 and 17 respectively while the pulley 8 carries corresponding clutch portions 18 and 19 respectively so that by shifting the pulley 8 along the shaft 9 this pulley may be clutched with either of the pinions 10 or 15 or with neither of them. Thus the pulley 8 and hence also the pulley 3 may be driven in the one or in the other direction or may be stopped at will.

The shaft 9 is driven from a main shaft 19 through the medium of conical pulleys 20, 21 and a belt 22 so that by shifting this belt the speed of the shaft 9 may be varied at will.

The delivery end of each section of the conveyer is located substantially above the receiving end of the next following section, and leaves a free space between these two ends which is sufficiently large to permit all the material carried by the preceding conveyer section to pass through.

Assuming that the direction and speed of the movement of the conveyer belt of one section B are the same as those of the preceding one A then the material conveyed by the section A will on reaching the delivery end (the right hand end as shown in the drawing) fall to the receiving end (the left hand end) of the next section B the latter being overlapped by the delivery end of the preceding section. As the conveyer belts of the two sections A and B move in the same direction and with the same speed the material will be conveyed forward by the belt of section B as quickly as it is delivered thereto, and none of it will fall or will be thrown off through the open space between these two sections. The same will be the case if the belt of section B moves faster than the belt of section A and in the same direction. Assuming then that the belt of the third section C moves in a direction opposite to that of the belt 4 of the second section B, the material arriving at the delivery end of this second section B will again fall onto the receiving end of section C but as the belt of the latter moves in a direction opposite to that of the belt of the section B the material falling on the belt of section C will not be conveyed forward but will be conveyed in the opposite direction, that is to say, toward the free space between the adjacent ends of sections B and C and thrown off there onto the distributing gate 6. Substantially the same will be the case if the conveyer belt of section C is stopped except that the material will first accumulate on the belt of C until it falls by gravity. But if the conveyer belt of section C moves in the same direction as the belt of section B but with a slower speed, then only part of the material delivered to section C will be conveyed forward by the belt of the latter while the remainder of the material will first accumulate at the receiving end of a section C and then fall by gravity through the space between the two overlapping ends of sections B and C. Thus it will be seen that by properly selecting the speeds of the belts of successive sections the quantity of material thrown off between such sections may be determined at will and the material thrown off may be distributed at will over the entire length of the plant.

I claim—

In a conveying apparatus the combination of a frame; pulleys arranged in diagonally disposed pairs journaled on said frame; an endless conveyer belt mounted to travel on each pair of said pulleys, each of said belts having its delivery end disposed above and beyond the receiving end of its respective succeeding belt, and providing a space for the passage of material; a distributing gate swingingly mounted beneath each of said passages; and an independent driving means for each of said belts whereby the several belts may be simultaneously operated in different directions and at variable speeds, substantially as described.

In testimony whereof, I affix my signature, in presence of two witnesses.

ZYGMUNT RODAKOWSKI.

Witnesses:
 ARTHUR BANNERMAN,
 AUGUST FUGGER.